United States Patent [19]

Buehler et al.

[11] Patent Number: 5,610,246

[45] Date of Patent: Mar. 11, 1997

[54] PROCESS FOR POLYMERIZING PROPYLENE USING A SILICA-SUPPORTED CATALYST

[75] Inventors: Charles K. Buehler; Albert P. Masino, both of Naperville, Ill.

[73] Assignee: Quantum Chemical Corporation, Cincinnati, Ohio

[21] Appl. No.: 597,469

[22] Filed: Feb. 5, 1996

Related U.S. Application Data

[60] Continuation of Ser. No. 694,574, May 2, 1991, abandoned, which is a division of Ser. No. 521,302, May 9, 1990, Pat. No. 5,034,365.

[51] Int. Cl.⁶ .................................................... C08F 4/656
[52] U.S. Cl. .................. 526/119; 526/124.6; 526/129; 502/116; 502/119
[58] Field of Search ................ 526/119, 124.6, 526/129

[56] References Cited

U.S. PATENT DOCUMENTS

| | | | |
|---|---|---|---|
| 3,135,809 | 6/1964 | Bosmajian | 260/650 |
| 3,591,656 | 6/1971 | Kroll | 260/683.9 |
| 4,156,063 | 5/1979 | Giannini et al. | 526/114 |
| 4,220,554 | 9/1980 | Scata et al. | 252/429 B |
| 4,226,741 | 10/1980 | Luciani et al. | 252/429 B |
| 4,298,718 | 11/1981 | Mayr et al. | 526/125 |
| 4,385,161 | 5/1983 | Caunt et al. | 526/119 |
| 4,390,454 | 6/1983 | Cuffiani et al. | 252/429 B |
| 4,394,291 | 7/1983 | Hawley | 252/429 |
| 4,472,521 | 9/1984 | Band | 526/119 |
| 4,482,686 | 11/1984 | Asahi et al. | 526/119 |
| 4,495,338 | 1/1985 | Mayr et al. | 526/126 |
| 4,503,159 | 3/1985 | Masino et al. | 502/111 |
| 4,508,843 | 4/1985 | Etherton et al. | 502/115 |
| 4,526,941 | 7/1985 | Sakurai et al. | 526/127 |
| 4,530,913 | 7/1985 | Pullukat et al. | 502/104 |
| 4,544,716 | 10/1985 | Hawley | 526/119 |
| 4,565,795 | 1/1986 | Short et al. | 502/110 |
| 4,595,735 | 6/1986 | Nomura et al. | 526/125 |
| 4,612,299 | 9/1986 | Arzoumanidis et al. | 502/104 |
| 4,647,550 | 3/1987 | Kohora et al. | 502/115 |
| 4,686,199 | 8/1987 | Tachikawa et al. | 502/104 |
| 4,732,882 | 3/1988 | Allen et al. | 526/129 |
| 4,738,942 | 4/1988 | Nowlin | 502/104 |
| 4,743,665 | 5/1988 | Sasaki et al. | 526/119 |
| 4,849,483 | 7/1989 | Tachikawa et al. | 526/97 |
| 4,857,613 | 8/1989 | Zolk et al. | 526/128 |
| 4,916,099 | 4/1990 | Sasaki et al. | 502/126 |
| 4,950,630 | 8/1990 | Murata et al. | 502/116 |
| 4,950,631 | 8/1990 | Buehler et al. | 502/119 |
| 4,990,478 | 2/1991 | Hoppin et al. | 526/125 |
| 5,053,467 | 10/1991 | Kondo et al. | 526/124 |
| 5,095,080 | 3/1992 | Lee et al. | 526/119 |
| 5,104,949 | 4/1992 | Buehler et al. | 526/119 |
| 5,143,883 | 9/1992 | Buehler et al. | 502/119 |
| 5,232,998 | 8/1993 | Buehler et al. | 526/124.6 |

FOREIGN PATENT DOCUMENTS

| | | |
|---|---|---|
| 36148/89 | 12/1989 | Australia. |
| 0115833 | 8/1984 | European Pat. Off. . |
| 0193281 | 9/1986 | European Pat. Off. . |
| 0206172 | 12/1986 | European Pat. Off. . |
| 0244678 | 11/1987 | European Pat. Off. . |
| 0245854 | 11/1987 | European Pat. Off. . |
| 0292134 | 11/1988 | European Pat. Off. . |
| 58-162607 | 9/1983 | Japan. |
| WO89/02446 | 3/1989 | WIPO. |

*Primary Examiner*—Romulo H. Delmendo
*Attorney, Agent, or Firm*—William A. Heidrich

[57] ABSTRACT

A new catalyst useful in the polymerization of at least one olefin is disclosed. The catalyst comprises the product obtained by contacting silica, in random order, with (1) at least one hydrocarbon soluble magnesium-containing compound; and (2) a first modifying compound selected from the group consisting of silicon halides, boron halides, aluminum halides and mixtures thereof followed by a second modifying compound selected from the group consisting of halides having the structural formula $SiH_rX^2_s$, where $X^2$ is halogen; r is an integer of 1 to 3; and s is an integer of 1 to 3 with the proviso that the sum of r and s is 4, a hydrogen halide and mixtures thereof. The product of this step is contacted with a first titanium-containing compound having the structural formula $Ti(OR)_mX_n$, where R is hydrocarbyl or cresyl; X is halogen; m is an integer of 1 to 4; and n is 0 or an integer of 1 to 3, with the proviso that the sum of m and n is 4. Finally, the product of this latter step is, in turn, contacted with a second titanium-containing compound, different from the first titanium-containing compound, having the structural formula $TiX^1_p(OR^1)_q$, where $X^1$ is halogen; $R^1$ is hydrocarbyl; p is an integer of 1 to 4; and q is 0 or an integer of 1 to 3, with the proviso that the sum of p and q is 4. A catalyst system comprising the above catalyst, an aluminum-containing first cocatalyst and at least one silane second cocatalyst is also set forth. Finally, a process for polymerizing at least one olefin utilizing the catalyst system of this disclosure is taught.

5 Claims, No Drawings

PROCESS FOR POLYMERIZING PROPYLENE USING A SILICA-SUPPORTED CATALYST

This is a continuation of application(s) Ser. No. 07/694,574, filed on May 2, 1991, now abandoned which is a Divisional of U.S. Ser. No. 07/521,302, filed on May 9, 1990, now U.S. Pat. No. 5,034,365.

BACKGROUND OF THE DISCLOSURE

1. Field of the Invention

The polymerization of olefins using Ziegler-Natta catalysts is widely utilized. These catalysts provide polyolefins possessing the desired characteristics of these polymers in high yield. However, the use of these conventional catalysts are subject to important failings. Thus, new and improved catalysts are continually being sought. An important class of catalysts where such improvement is sought are those catalysts which aid in the polymerization of the commercially very important alpha-olefin, propylene.

Commonly in the polymerization of many alpha-olefins, especially propylene, a catalyst having a magnesium halide support is utilized. However, when polyolefins, catalytically polymerized with a magnesium halide supported catalyst, are processed into molded products, the molding apparatus processing the polyolefin is subject to corrosion. This corrosion is caused by the residual presence of magnesium halide in the polymeric product. The adverse effect of this corrosion is not limited to damaging expensive molding machinery. More importantly, the polymeric molded article processed in this equipment is often characterized by aesthetic flaws.

Another detrimental property of catalysts, conventionally used in the polymerization of olefins, notably propylene polymers, is caused by their incorporation of internal electron donors. These donors are included in the catalyst to insure that the propylene polymer product is highly isotactic. Those skilled in the art are aware of the criticality of stereoregularity in propylene polymers. However, those skilled in the art are also aware that the presence of internal electron donors creates difficulties. Unless the amount and type of electron donor compound is carefully selected not only is the stereoregularity of the resultant polymer deficient but, in addition, poor catalytic activity often results. This detrimental effect occurs even if the amount and type of electron donor is properly chosen but the catalyst is formed with the electron donor compound added in the wrong sequence.

The utilization of electron donor compounds often creates additional problems involving offensive odors in the final polymeric product. This unfortunate result obtains even if the ideal electron donor compound, in the correct concentration, added at the proper time in the catalyst formation process, is utilized. Thus, polymers polymerized in the presence of catalysts which include an electron donor compound must oftentimes be deashed or deodorized in order to insure the absence of odor in the final product.

Very recently a patent application, a co-applicant of which is co-inventor of the present invention, defined a new catalyst which substantially overcomes the problems discussed above. That is, a new catalyst is therein described which produces olefinic polymers, especially propylene polymers, which possess high stereoregularity, uniform particle size distribution, good spherical morphology and high bulk density. Although this invention represents a significant advance in the art, improvements over it are highly desirable.

Although the catalyst of this new invention provides an activity in excess of those normally obtained in propylene polymerization, it is always desirable to improve this activity. Not only does a higher activity producing catalyst increase the efficiency of the polymerization process but insures a higher purity product. Those skilled in the art are aware that the effect of higher activity not only reduces the amount of catalyst required per unit weight of polymer product but this also translates into lower catalyst concentration in the final polymeric product.

It is also noted that the catalyst of this recent application produces a polymer having excellent bulk density and as a corollary thereof, low fines concentration. However, these properties, like other properties, are always subject to improvement. Those skilled in the art are aware that the greater the bulk density, the greater the productivity of a polymerization process independent of catalyst activity. The greater the bulk density, the greater the weight of polymer produced per unit volume of reactor. The lower the fines concentration, that is, the lower the concentration of very small polymer particles, moreover, the lesser the problem associated with plugging of process equipment, conduits and, especially, filters. Such plugging causes serious interruptions in production schedules.

A final desirable property that the significantly improved catalyst of the recent prior art does not fully address is the catalyst's hydrogen response. Those skilled in the olefin polymerization art are aware that variation of hydrogen concentration in olefin polymerization reactions affects catalyst activity as well as polymer properties. Certain catalysts enhance these results, others diminish them and yet others have little effect.

The above remarks make clear the continuing need in the art for a new olefin polymer catalyst having the desirable properties considered above. They also establish that although recent prior art has significantly addressed these needs further improvements are highly desired in the art.

2. Background of the Prior Art

Japanese Patent Publication 162,607/1983 attempts to eliminate the problem created by halogen-containing carriers. In this disclosure inorganic oxides, such as silica, were proposed as a catalyst support. This carrier, containing no halogen, was reacted with a magnesium dialkoxide and an electron donor, such as a carboxylic acid monoester, and a titanium halide compound.

Even if the allegations made in this disclosure of high catalytic activity, production of a highly stereospecific polymer having a high bulk density and narrow particle size distribution were correct, the problems associated with catalyst odor were not addressed. However, testing of this catalyst established that the catalyst provided less than desired activity and that the olefinic polymer product was wanting in stereoregularity and particle size distribution.

A more recent disclosure, U.S. Pat. No. 4,595,735, provides a catalytic component for the polymerization of olefins prepared by contacting a magnesium alkoxide, a halogenated hydrocarbon, a halogenated silane and a titanium compound. It is emphasized that this catalyst, useful in the polymerization of ethylene homopolymers and copolymers, incorporates a halogenated hydrocarbon. This catalyst is not only principally directed at the polymerization of ethylene polymers but, significantly, emphasizes the formation of high melt index polymers. Those skilled in the art are aware that however useful this catalyst is in ethylenic polymer applications, its application to propylene polymers is restricted. Most propylene polymers are used in applications requiring a polymer of low melt flow rate. That is, the molecular weight of the polymers produced in accordance with the '735 catalyst is significantly lower than that required of polypropylene.

U.S. Pat. No. 4,565,795 sets forth an olefin polymerization catalyst which is prepared by the reaction of a chemically treated silica support with a dihydrocarbyl magnesium compound and a halogenated tetravalent titanium compound. The chemical treatment of the silica support involves the use of a chlorinating compound, an alkanol, a silylating compound, an acid chloride or an organoboron compound. Again, this catalyst includes constituents which are adverse to the production of stereoregular polymers, especially polypropylene. It is thus not surprising that this catalyst is suggested for use in the polymerization of ethylene polymers.

U.S. patent application, Ser. No. 326,708, filed Mar. 21, 1989, now U.S. Pat. No. 4,950,631 a co-applicant of which is a co-inventor of the present invention, is the recent application which addresses many but not all of the demands required of olefin catalysts. This catalyst has been discussed earlier.

U.S. Pat. No. 4,394,291 discloses a catalyst useful in the polymerization of olefins. This catalyst involves the reaction of a Group II metal dihalide with a transition metal compound. It is noted that in an alternate embodiment this reaction also involves an electron donor. This product is, in turn, reacted with an organoaluminum compound. Finally, the product of this further reaction is reacted with a halide ion exchanging source. Such a source may be a multiplicity of agents of which the combination of titanium tetrachloride with any one of silicon tetrachloride, trichlorosilane, dichlorophenylsilane and dichlorodiphenylsilane is preferred.

U.S. Pat. No. 4,503,159 describes an olefin polymerization catalyst formed by reacting water with a magnesium dihalide in the presence of a phase transfer catalyst and reacting this product with a benzoic acid ester, an alkoxytitanium compound, an organoaluminum halide and a halogen ion exchanging source. The preferred halogen ion exchanging source is titanium tetrachloride or titanium tetrachloride and a silicon halide which may be trichlorosilane and/or silicon tetrachloride.

U.S. Pat. No. 4,544,716 sets forth a similar catalyst to the '159 patent wherein, again, a halide ion exchanging source is utilized. A particular preferred source is titanium tetrachloride, trichlorosilane and silicon tetrachloride present in a molar ratio in the range of about 2.5:2:1 to 4:3.5:1. The volume of these components are preferably such that the combined volume of the trichlorosilane and silicon tetrachloride equals that of the titanium tetrachloride.

European Patent Number Application 0 115 833 discusses an olefin polymerization catalyst in which a magnesium dihalide combined with water is reacted with a benzoic acid ester and an alkoxytitanium compound to form a first catalyst component. This first component is reacted with a organoaluminum halide. The solid product of this reaction is reacted with a halide ion exchanging source. The ion exchanging source in a preferred embodiment is titanium tetrachloride, trichlorosilane and silicon tetrachloride.

SUMMARY OF THE INVENTION

The present invention is directed to a catalyst which, when added to olefin polymerization reactants, produces olefin homopolymers and copolymers of high stereoregularity. The polymeric product of polymerization reactions using the catalyst of this invention is characterized by uniform particle size distribution, good spherical morphology and high bulk density. These characteristics enhance the productivity and processability of the polymer. In addition, the catalyst is itself highly active, resulting in high polymer productivity, as manifested by weight of polymer per unit weight of catalyst per hour.

The catalyst of this invention is also characterized by safe and easy preparation. Unlike the preparation of magnesium halide supported catalysts, expensive ballmilling is not required. Neither are other expensive prepolymerization steps required of magnesium halide supported catalysts. Because the catalyst includes no halogen in the support, the product polymer has low halogen content, significantly reducing the problems of corrosion oftentimes encountered in the processing of such polymers produced from magnesium halide supported catalysts. Moreover, because the catalyst retains low residual metal content, no deashing of the polymer product is required. Additionally, the polymerization reaction utilizing this catalyst is enhanced due to its outstanding activity, which is relatively constant over long periods of time. Finally, the use of the subject catalyst allows for enhanced activity and easy control of polymer molecular weight with the judicious addition of hydrogen.

In accordance with the present invention a catalyst is provided. The catalyst comprises the product obtained by initially contacting silica with at least one hydrocarbon soluble magnesium compound and at least two modifying compounds. The sequence of contact with silica by the hydrocarbon soluble magnesium compound and the first and second modifying compounds is random with the requirements, however, that the first modifying compound contact the silica before the second modifying compound and that the modifying compounds contact the silica without interruption by contact with the hydrocarbon soluble magnesium compound. The first modifying compound is selected from the group consisting of silicon halides, boron halides, aluminum halides and mixtures thereof. The second modifying compound, which contacts the silica after the first modifying compound, is selected from the group consisting of halogenated silanes of the formula $SiH_rX^2_s$, where $X^2$ is halogen; r is an integer of 1 to 3; and s is an integer of 1 to 3, with the proviso that the sum of r and s is 4, hydrogen halides of the formula $HX^3$, where $X^3$ is halogen, and mixtures thereof. The modified silica supporting magnesium is next contacted with a first titanium-containing compound having the structural formula $Ti(OR)_mX_n$, where R is hydrocarbyl, cresyl or mixtures thereof; X is halogen; m is an integer of 1 to 4; and n is 0 or an integer of 1 to 3, with the proviso that the sum of m and n is 4. The product of this contact is then treated with a second titanium-containing compound having the structural formula $TiX^1_p(OR^1)_q$ where $X^1$ is halogen; $R^1$ is aryl or alkyl; p is an integer of 1 to 4; and q is 0 or an integer of 1 to 3, with the provisos that the sum of p and q is 4 and that the first titanium-containing compound and the second titanium-containing compound are not identical.

In another aspect of the present invention a catalyst system is described. The catalyst system comprises the above catalyst, a first cocatalyt, an aluminum-containing compound, and a second cocatalyst, a hydrocarbylalkoxysilane.

In still another aspect of the present invention a process for polymerizing olefins is disclosed. In this process at least one olefin is polymerized under olefin polymerization conditions utilizing the catalyst system of the present invention, which includes the catalyst of the present invention, the first co-catalyst, an aluminum-containing compound, and the second co-catalyst, a hydrocarbylalkoxysilane.

DETAILED DESCRIPTION

The catalyst of the present invention is prepared by initially contacting silica with at least one hydrocarbon soluble magnesium compound and at least two modifying compounds.

The silica employed in the catalyst of the subject invention is preferably pure but may contain minor amounts of other inorganic oxides such as alumina, titania, zirconia, magnesia and the like. In general, the silica support comprises at least 90% by weight pure silica. More preferably, the weight percentage of pure silica is at least 95%. Most preferably, the weight percentage of pure silica is at least 99%.

The silica utilized in the formation of the catalyst, is preferably defined by a surface are in the range of between about 80 m$^2$/g. and about 300 m$^2$/g., a median particle size of about 20 microns to about 200 microns and a pore volume of between about 0.6 cc/g. and about 3.0 cc/gram.

In a preferred embodiment the silica employed in the preparation of the catalyst is treated to replace hydroxyl groups on the surface of the silica with a surface characterized by the structural formula

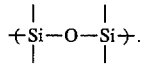

To accomplish this replacement the silica may be calcined in an inert atmosphere at a temperature of at least 150° C. Preferably, the calcining operation involves heating the silica at a temperature in the range of between about 550° C. and about 650° C. in an inert atmosphere, preferably provided by nitrogen gas.

Another method of treating the silica used in making the catalyst involves contacting the silica with a hexaalkyl disilazane. Of the hexaalkyl disilazanes useful in this application, hexamethyl disilazane is preferred.

Yet a third method of treating silica to replace its hydroxyl-containing surface is to subject the silica to both treatment with hexaalkyl disilazane and calcination. In this method, the sequence of these processing steps is random. However, it is preferred that the hexaalkyl disilazane treatment precede calcination. It is also noted that in this latter preferred embodiment calcination need only constitute exposure to a temperature of at least about 100° C., although higher temperature exposure is certainly not detrimental.

As stated above, the silica is contacted with at least one hydrocarbon soluble magnesium-containing compound. Hydrocarbon soluble magnesium compounds that can be used in the preparation of the catalyst of this invention include dihydrocarbyloxymagnesiums, hydrocarbyloxymagnesium halides and mixtures thereof. Preferably, the magnesium compounds are dialkoxymagnesiums, alkoxymagnesium halides and mixtures thereof. Especially preferred magnesium compounds, contemplated for use in the preparation of the catalyst of the present invention include 2-methylpentyloxymagnesium chloride, pentyloxymanesium chloride, 2-ethylhexyloxymagnesium chloride, di-2-ethylhexyloxymagnesium and mixtures thereof. Of these, 2-ethylhexyloxymagnesium-chloride and 2-methylpentyloxymagnesium chloride are particularly preferred.

The contact between the silica and the soluble magnesium compound or compounds usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably this contact occurs over a period of between about 1½ hours and about 2½ hours.

In addition to the silica contacting at least one soluble magnesium compound, the silica also contacts at least two modifying compounds. The first of these modifying compounds is selected from the group consisting of silicon halides having the structural formula $SiX^4_4$, boron halides, having the structural formula $BX^5_3$, aluminum halides having the structural formula $AlX^6_3$, where $X^4$, $X^5$ and $X^6$ are the same or different and are halogen, and mixtures thereof. Preferably, $X^4$, $X^5$ and $X^6$ are the same or different and are chlorine or bromine. Thus, it is preferred that the first modifying compound be silicon tetrachloride silicon tetrabromide, boron trichloride, boron tribromide, aluminum trichloride, aluminum tribromide or mixtures thereof It is more preferred that $X^4$, $X^5$ and $X^6$ be chlorine. Thus, it is preferred that the first modifying compound be silicon tetrachloride, boron trichloride, aluminum trichloride or mixtures thereof. Of these silicon tetrachloride is most preferred.

The second modifying compound which contacts the silica sequentially after contact with the first modifying compound, is selected from the group consisting of a halogenated silane having the structural formula $SiH_rX^2_s$, where $X^2$ is halogen; r is an integer of 1 to 3; and s is an integer of 1 to 3, with the proviso that the sum of r and s is 4, a hydrogen halide having the structural formula $HX^3$ where $X^3$ is halogen, and mixtures thereof.

Preferably, the second modifying compound having one of the two structural formulae given above is characterized by $X^2$ and $X^3$ being the same or different and being chlorine or bromine. In the preferred embodiment wherein the second modifying compound is the silane, it is further preferably characterized by r being an integer of 1 or 2 and s being an integer of 2 or 3. Still more preferably, the second modifying compounds are characterized by both $X^2$ and $X^3$ being chlorine and, in the case of the silane compound, r being 1 and s being 3.

Among he preferred second modifying compounds are trichlorosilane, tribromosilane, dichlorosilane, dibromosilane, hydrogen chloride, hydrogen bromide and mixtures thereof. Of these, trichlorosilane, hydrogen chloride and mixtures are more preferred. The use of trichlorosilane as the second modifying compound is most preferred.

The concentrations of the first and second modifying compounds preferably utilized in the formation of the catalyst are such that the molar ratio of first to second modifying compound is in the range of between about 50:50 and about 99:1. More preferably this molar ratio of the first to the second modifying compound is in the range of between about 60:40 and about 95:5, respectively. Still more preferably, this molar ratio is in the range of between about 70:30 and about 92:8. Even still more preferably, this molar ratio is in the range of between about 80:20 and about 90:10.

There is preferably no appreciable time duration between contact of the silica with the first and second modifying compounds. This contact is preferably sequential. That is, it is preferred that the first and second modifying compounds contact the silica in sequential order, the second modifying compound right after the first modifying compound. The contact between the silica, whether previously contacted with the hydrocarbon soluble magnesium compound or not, with the first and second modifying compounds, preferably occurs at a temperature in the range of between about 10° C. and about 60° C. More preferably, the temperature of contact between the silica and the modifying compounds is in the range of between about 20° C. and about 55° C. Still more preferably, this contact occurs at a temperature of between about 25° C. and about 50° C. Most preferably, the contact temperature is in the range of about 30° C. and about 45° C. The duration of contact is preferably between about 10 minutes and about 2 hours. More preferably, the period of time over which contact occurs is between about 20 minutes and 1½ hours. Still more preferably, the time duration over which contact between silica and modifying compounds occurs is between about 30 minutes and about 1 hour.

Although the order of contact between the silica and the magnesium compound and the silica and the modifying compounds is random, it is again emphasized that the first modifying compound contacts the silica prior to contact with the second modifying compound. It is emphasized, however, that although the sequence of contact with silica by the magnesium and modifying compounds is random, it is preferred that the silica initially contact the magnesium compound followed by contact with the first and then the second modifying compounds.

In a preferred embodiment, the product of contact between the silica and the hydrocarbon soluble magnesium compound and the modifying compounds is next washed. That is, the product is washed with an organic solvent to remove any organic-soluble residue. Although the organic solvent may be any solvent in which the solid product does not dissolve, it is preferred that the solvent be a hydrocarbon, either aliphatic or aromatic. Of these hydrocarbons, alkanes of 5 to 15 carbon atoms are more preferred. Of these, hexane and heptane are even more preferred. Heptane is most preferred.

In the washing step the product is immersed in the solvent with stirring at ambient temperature. The solvent is thereafter removed by decantation, siphoning or the like. This procedure may be repeated. Indeed, this washing step is preferably repeated two to four times.

The silica product, after contact with the hydrocarbon soluble magnesium compound and the two modifying compounds, whether washed or not, is next contacted with a first titanium-containing compound having the structural formula $Ti(OR)_mX_n$, where R is cresyl, hydrocarbyl or mixtures thereof; X is halogen; m is an integer of 1 to 4; and n is 0 or an integer of 1 to 3 with the proviso that the sum of m and n is 4.

In a preferred embodiment, the first titanium-containing compound, having the structural formula given above, is characterized by R being cresyl or alkyl; X being chlorine or bromine; m being an integer of 2 to 4; and n being 0, 1 or 2. Thus, the first titanium-containing compound is preferably a dihydrocarbyloxytitanium dichloride, a dihydrocarbyloxytitanium dibromide, a trihydrocarbyloxytitanium chloride, a trihydrocarbyloxytitanium bromide or a tetrahydrocarbyloxytitanium.

In a particularly preferred embodiment, the first titanium-containing compound is a titanium ester free of halide. That is, the first titanium-containing compound is characterized by the structural formula given above where m is 4 and n is 0. Particularly preferred titanium esters, proposed for use in the formation of the catalyst of the subject invention, include titanium tetracresylate, titanium tetrabutoxide, titanium tetranonanolate, titanium tetra-2ethylhexylate, titanium tetraisobutylate, titanium tetra-n-propylate, titanium tetraisopropylate and the like.

The first titanium-containing compound, to improve contact with the silica composition, is preferably provided as a solution, the solvent being an inert organic which does not, in any way, affect the silica composition and in which the first titanium-containing compound is soluble. The first titanium-containing compound, preferably contacts the silica composition at ambient temperature.

The final step in the preparation of the catalyst of this invention involves contacting the silica treated earlier with the magnesium-containing compound, the modifying compounds and, immediately therebefore, by the first titanium compound with a second titanium-containing compound having the structural formula $TiX^1_p(OR^1)$ where $X^1$ is halogen $R^1$ is hydrocarbyl; p is an integer of 1 to 4; and q is 0 or an integer of 1 to 3 with the proviso that the sum of p and q is 4. The second titanium-containing compound is further limited by the requirement that it is not identical to said first titanium-containing compound.

In a preferred embodiment, the second titanium-containing compound is characterized by its above-defined structural formula where $X^1$ is chlorine or bromine; R is alkyl; p is an integer of 2 to 4; and q is 0, 1 or 2. Compounds within the scope of this preferred embodiment, preferred for use in the preparation of the catalyst of the present invention, include titanium tetrachloride, titanium tetrabromide, methoxytitanium trichloride, methoxytitanium tribromide, ethoxytitanium triciorid, ethoxytitanium tribromide, dimethoxytitanium dichloride, dimethoxytitanium dibromide, diethoxytitanium dichloride, diethoxytitanium dibromide and the like.

Still more preferably the second titanium-containing compound is defined by p being an integer of 4 and q being 0. That is, the titanium compound is titanium tetrachloride or titanium tetrabromide. Of the two, titanium tetrachloride is particularly preferred for use as the second titanium-containing compound.

The first and second titanium-containing compounds and the silica composition with which they are contacted are exposed to a temperature in the range of between about 60° C. and about 130° C. Preferably, these components are subjected to a temperature in the range of between about 75° C. and about 120° C. More preferably, the temperature of this contact is in the range of between about 85° C. and about 115° C. Most preferably, this temperature range is between about 90° C. and about 105° C.

The time duration of this contact at elevated temperature is between about 15 minutes and about 3 hours. Preferably, this time duration is in the range of between about 30 minutes and 2 hours. More preferably, the time of contact between the silica composition and the first and second titanium-containing compounds is between about 45 minutes and about 1½ hours.

An optional preferred step in the formation of the catalyst involves washing of the product of contact of the silica composition and the first and second titanium-containing compounds. The washing of this product involves the same process discussed above in the discussion of the washing of the silica composition prior to treatment with the first and second titanium-containing Compounds. Thus, the use of hydrocarbon solvents of the types discussed in the preferred first washing step is preferred. It is desirable, however, in the preferred embodiment wherein the product of the titanium compounds contact is washed, that the number of washing cycles be increased. Thus, whereas the first washing step preferably employs about two to four washing cycles, it is preferred that this second optional washing procedure involve about six to eight washing cycles.

It should be appreciated that all the treatment steps in the formation of the catalyst of this invention, the contact of silica with the hydrocarbon soluble magnesium compound, the modifying compounds and the first and second titanium-containing compounds, involve contact between a solid, silica, and a liquid. This is because each of the compounds that are contacted with silica are liquids or are soluble in an inert hydrocarbon solvent under the conditions of use. As such, no ballmilling or other solid mixing is required. This expensive and difficult operation, usual in the formation of polymerization catalysts of the prior art, is thus eliminated. Those skilled in the art are aware, in the case where a hydrocarbon solvent is employed, that the solvent may be allowed to remain with the reaction mass or can be removed by decantation, filtration, evaporation or the like.

Further observations regarding the above catalyst formation steps include the facts that the morphology of the polymer produced from this catalyst emulates the support; that the absence of any halogen in the support aids in keeping the halogen content of the polymer produced therefrom low; that the relatively low concentrations of titanium and magnesium on the silica support also tends to keep polymeric magnesium and titanium concentrations at similarly low levels; that the preparation of the catalyst of the present invention is conducted at moderate temperature, preferably, in the range of between about 0° C. and 100° C.; and that even though this catalyst does not need an electron donor for good isotacticity it is possible to use one or more of them if desired.

Another aspect of the present invention is directed to a catalyst system. The catalyst system of this invention comprises the catalyst described in detail above, a first co-catalyst and a second co-catalyst.

The first co-catalyst of the catalyst system is an aluminum-containing compound. The aluminum-containing compound is preferably an alkylaluminum-containing compound. The alkylaluminum-containing compound is preferably a trialkylaluminum, alkylaluminum halide or mixtures thereof. More preferably, the co-catalyst is a trialkylaluminum. Of the trialkylaluminums, triethylaluminum and tri-n-propylaluminum are particularly preferred.

The second co-catalyst of the catalyst system is preferably at least one silane compound. Preferably, the silane compound is a hydrocarbylalkoxysilane. Preferred hydrocarbylalkoxysilanes include hydrocarbyltrialkoxysilanes, dihydrocarbyldialkoxysilanes and trihydrocarbylalkoxysilanes. Of these, the dihydrocarbyldialkoxysilanes and the trihydrocarbylalkoxysilanes are more preferred.

The hydrocarbyl component of the silane, second cocatalyst, compound is preferably phenyl, alkaryl, or $C_1$–$C_{10}$ linear, branched or cyclic alkyl. The preferred alkoxy is one containing one to six carbon atoms.

In still another aspect of the present invention a process for polymerizing an olefin is set forth. This process comprises polymerizing at least on olefin under olefin polymerization conditions in the presence of the catalyst system of the present invention. That is, in the presence of the catalyst of the subject invention, the first co-catalyst and the second co-catalyst.

In a particularly preferred embodiment of this aspect of the present invention, the olefin polymerized is propylene. In this preferred embodiment, polymerization occurs at a temperature in the range of between about 35° C. and about 100° C. More preferably, the temperature of this reaction is in the range of about 50° C. and about 80° C. The pressure of the propylene polymerization reaction is in the range of between about 300 psig and about 600 psig, more preferably, between about 400 psig and about 500 psig. In a preferred embodiment the propylene polymerization occurs in the presence of hydrogen gas.

The following examples are given to illustrate the scope of this invention. Because these examples are given for illustrative purposes only, the invention embodied therein should not be limited thereto.

EXAMPLE 1

Preparation of Catalyst

Into a 250 ml. four-necked round flask, purged with nitrogen gas free of oxygen and water, was placed silica (5.0 g). The silica (Davison [trademark] 948) had previously been treated with hexamethyl disilazane. The flask and its contents were heated with stirring for 1 hour at 100° C.

The flask was allowed to cool. When ambient temperature was reached, 2-methylpentyloxymagnesium chloride (17.4 g., 15 mmol.) in a solution of heptane (22 ml.) was added to the flask. The flask was thereupon heated to 60° C. under a nitrogen purge and was maintained a this temperature for 30 minutes. This contact was conducted with stirring. The temperature was then raised to 80° C. and maintained at this temperature, with stirring, for another 30 minutes. Thereupon, under continued stirring, the temperature was raised to and maintained at between 100° C. and 110° C. for about 1½ hours. During this period much of the heptane solvent distilled off. The flask was then cooled to ambient temperature. The product of this contact was a white solid having flour-like consistency.

T6 this solid, in the 250 ml. flask, was added silicon tetrachloride (3.78 g., 22.0 mmol.) in a heptane (10 ml.) solution. Immediately following this addition, trichlorosilane (0.6 g., 4.4 mmol.) was added. The solution immediately solidified while the flask was heated for 40 minutes at 40° C. With stirring. At the end of this period stirring and heating were discontinued.

The solid product of this contact settled and the supernatant liquid was siphoned off. The solid product was washed three times in heptane. In each washing cycle heptane (70 ml.) Was added to the solid with stirring. After a few minutes stirring was discontinued and the solid was allowed to settle. The heptane solvent was then siphoned off.

To the thus washed product in the flask was added titanium tetracresylate (1.2 ml., 1.05 g., 2.2 mmol.) In an equal volume of heptane (1.2 ml.). The titanium tetracresylate solution was added at ambient temperature. After this addition titanium tetrachloride (17.3 g., 87 mmol.) Was introduced into the flask. This addition again occurred at ambient temperature. The flask and its contents were then heated at between 90° C. and 100° C. for 1 hour. At the conclusion of this period the solid product was washed with heptane, in accordance with the procedure of the first washing step except that the heptane volume of each washing cycle was increased to between 80 ml. and 90 ml., and the number of washing cycles was increased to seven, instead of the three cycles of the earlier step.

The product of this preparation was a salmon colored solid. Its chemical constituency is summarized in Table 1.

EXAMPLE 2

Preparation of Catalyst

The preparation of Example 1 was repeated except that the product produced by the addition of silicon tetrachloride and trichlorosilane was heated for 30 minutes at 26° C. Followed by being heated for 30 minutes at 50° C.; instead of at 40° C. for 40 minutes as was done in Example 1.

It is emphasized that other than the above processing variation, the preparation of Example 2 was identical with the preparation of Example 1.

The chemical constituency o the catalyst of this example is summarized in Table 1.

COMPARATIVE EXAMPLE 1

Preparation of Catalyst

The catalyst preparation of Example 1 was reproduced except that an additional contact of first and second modifying components was added. That is, after contact with silicon tetrachloride and trichlorosilane in Example 1, the product of this contact was washed three times in heptane (70 ml.). It is also noted that prior thereto, the product was initially held at ambient temperature for 40 minutes followed by being heated at 40° C. for 40 minutes. After washing, the product was again contacted with silicon tetrachloride followed by trichlorosilane in the same amounts as in the first contact with these modifying compounds. The product of this second contact was allowed to remain at ambient temperature for 40 minutes followed by being heated for 40 minutes at 40° C. Thereupon, the product was again washed three times in heptane as after the first contact with the modifying compounds.

The chemical composition of the catalyst product of this preparation is included in Table 1.

COMPARATIVE EXAMPLE 2

Preparation of Catalyst

The preparation of Example 1 was identically repeated but for the substitution of the step of contacting the solid silica product with the modifying compounds, silicon tetrachloride and trichlorosilane, and the heat treatment step thereafter. Instead of this procedure, silicon tetrachloride (3 ml., 4.4 g., 26 mmol.) Was added, subsequent to the addition of about 10 ml. Of heptane, to the product of contact of the 2-methylpentyloxymagnesium chloride with silica. Upon completion of this contact the flask and its contents were stirred and allowed to remain at ambient temperature for 30 minutes followed by being heated at 60° C. For 30 minutes. Thereafter, the catalyst was identically prepared as in Example 1.

The chemical analyst of the catalyst product of this preparation is summarized in Table 1.

COMPARATIVE EXAMPLE 3

Preparation of Catalyst

The preparation of Comparative Example 2 was repeated but for the processing of the product of contact of the silica composition with silicon tetrachloride. Whereas in Comparative Example 2 the product of the flask was stirred for 30 minutes at ambient temperature followed by heating for 30 minutes at 60° C., in the preparation of this comparative example the flask and its contents were immediately heated to 40° C. for 40 minutes. Otherwise, this comparative example was conducted in exact accordance with the procedure of Example 1 and Comparative Example 2.

A summary of the chemical constituency of the catalyst produced in this comparative example appears in Table 1.

COMPARATIVE EXAMPLE 4

Preparation of Catalyst

The preparation of the catalyst of Example 1 was identically reproduced but for the step of contact with the two modifying compounds, silicon tetrachloride and trichlorosilane. In place of this step, in this comparative example, the silica previously contacted with 2-methylpentyloxymagnesium chloride was contacted only with a second modifying compound, trichlorosilane (3 ml., 4.0 g., 29 mmol.). The catalyst of this comparative example was thereafter processed in accordance with the procedure of Example 1. Thus, the product of contact with silicon tetrachloride was heated at 40° C. for 40 minutes with stirring. The subsequent steps, starting with washing this product with heptane, were in accordance with the procedure of Example 1.

A summary of the chemical constituency of the catalyst of this comparative example appears in Table 1.

TABLE 1

| Catalyst of Example No. | Catalyst Chemical Constituency | | | |
|---|---|---|---|---|
| | Wt % Ti | Wt % Mg | Wt % Cl | Wt % $SiO_2$ |
| 1 | 4.48 | 3.58 | 20.5 | 47.1 |
| 2 | 4.57 | 4.66 | 15.7 | 58.0 |
| CE1 | 3.11 | 2.77 | 16.3 | 33.3 |
| CE2 | 6.20 | 4.46 | 23.5 | 51.3 |
| CE3 | 5.14 | 4.23 | 22.2 | 54.1 |
| CE4 | 3.77 | 4.68 | 23.0 | 57.3 |

EXAMPLES 3 AND 4 AND COMPARATIVE EXAMPLES 5 TO 8

Polymerization of Propylene

The catalysts prepared in Examples 1 and 2 and in Comparative Examples 1 to 4 were utilized in the polymerization of propylene. Each of these catalysts were identically utilized. That is, a standard propylene polymerization reactor was separately charged with a 0.02 gram sample of each of the catalysts of Examples 1 and 2 and Comparative Examples 5 to 8. In addition, triethylaluminum (TEAL) and isobutylisopropyldimethoxysilane (IBIP) were included in concentrations such that the molar ratio of TEAL:IBIP:Catalyst was 80:8:1. Each propylene polymerization reaction was conducted at a pressure of 460 psig and a temperature of 70° C. In each of these reaction, also, 200 ml. of hydrogen gas was charged into the reactor. The polymerization reaction was conducted for 1 hour with stirring.

The propylene products of these polymerization reactions were weighed and analyzed. The results of the polymerization reactions are summarized in Table 2.

EXAMPLES 5 AND 6

Polymerization of Propylene

Additional samples of the catalysts of Examples 1 and 2 were utilized in additional propylene polymerization runs. The polymerization reaction of these examples was identical with that of Examples 3 and 4, utilizing the catalyst of Examples 1 and 2, respectively, but for the amount of catalyst utilized and the amount of hydrogen gas employed.

In Examples 5 and 6, the weight of catalyst sample was 0.01 g., half the weight of the samples of Examples 1 and 2, respectively. Since the weight of triethylaluminum (TEAL) and isobutylisopropylmethoxysilane (IBIP) remained the same, the molar ratio of TEAL:IBIP:catalyst was 160:16:1. In addition, the volume of hydrogen gas charged into the reactor was tripled to .600 ml.

The results of polymerization runs are summarized in Table 2.

TABLE 2

| Example Number | Catalyst of Example No. | Catalyst Activity, g. PP/g. Cat-hr | Propylene Characteristics | | | |
|---|---|---|---|---|---|---|
| | | | Ti Conc., ppm | Wt % Hept. Insol. | Bulk Dens., lb/ft$^3$ | Wt % Fines[1] |
| 3 | 1 | 11,000 | 4.0 | 96.6 | 25.0 | 1 |
| 4 | 2 | 11,150 | 3.8 | 97.2 | 24.9 | 6 |
| 5 | 1 | 20,000 | 2.4 | 95.9 | 25.0 | 1 |
| 6 | 2 | 14,000 | 4.1 | 92.7 | 24.0 | 6 |
| CE5 | CE1 | 5,500 | 9.4 | 91.4 | 22.4 | 4 |
| CE6 | CE2 | 9,000 | 5.1 | 95.7 | 22.0 | 8 |
| CE7 | CE3 | 8,600 | 6.2 | 96.4 | 22.8 | 12 |
| CE8 | CE4 | 3,100 | SEE FOOTNOTE [2] | | | |

[1]Fines are defined as those particles of less than 300 microns.
[2]Polypropylene properties were not determined in view of poor activity.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for polymerizing propylene comprising polymerizing propylene under propylene polymerization conditions in the presence of a catalyst system comprising (I) a catalyst component comprising the product prepared by the steps of:
   (a) contacting silica, pretreated to replace surface hydroxyl groups with a surface characterized by the structural formula

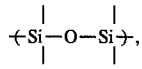

said silica characterized by a surface area of between about 80 m$^2$/g. and about 300 m$^2$/g, a median particle size of between about 20 microns and about 200 microns and a pore volume of between about 0.6 cc/g. and about 3.0 cc/g., with 2-methylpentyloxymagnesium chloride;
   (b) contacting the product of step (a) with silicon tetrachloride;
   (c) contacting the product of step (b) with trichlorosilane, with the proviso that the concentration of said silicon tetrachloride and said trichlorosilane contacting said products of steps (a) and (b), respectively, is such that the molar ratio of said silicon tetrachloride to said trichlorosilane is in the range of between about 70:30 and about 92:8;
   (d) contacting the product of step (c) with titanium tetracresylate; and
   (e) contacting the product of step (d) with titanium tetrachloride;

(II) a compound selected from the group consisting of triethylaluminum and tri-n-propylaluminum; and (III) isobutylisopropyldimethyoxysilane.

2. A process in accordance with claim 1 wherein said component (II) is triethylaluminum.

3. A process in accordance with claim 1 wherein said step (a) occurs at a temperature in the range of between about 50° C. and about 110° C. for a period of between about 1½ hours and about 2½ hours.

4. A process in accordance with claim 1 wherein said silica is pretreated by:
   (a) calcining said silica at a temperature of at least about 150° C. in an inert atmosphere,
   (b) treating said silica with a hexaalkyl disilazane or
   (c) in random order, calcining said silica at a temperature of at least about 100° C. in an inert atmosphere and treating said silica with a hexaalkyl disilazane.

5. A process in accordance with claim 4 wherein said calcining step (a) occurs at a temperature in the range of between about 550° C. and about 650° C. in a nitrogen atmosphere, and said hexaalkyl disilazane of steps (b) and (c) is hexamethyl disilazane.

* * * * *